(12) United States Patent
Cadima

(10) Patent No.: US 10,401,034 B2
(45) Date of Patent: Sep. 3, 2019

(54) ILLUMINATED COOKTOP BURNER APPLIANCE

(71) Applicant: General Electric Company, Schenectady, NY (US)

(72) Inventor: Paul Bryan Cadima, Prospect, KY (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 690 days.

(21) Appl. No.: 15/076,719

(22) Filed: Mar. 22, 2016

(65) Prior Publication Data

US 2017/0276374 A1    Sep. 28, 2017

(51) Int. Cl.
F24C 7/08     (2006.01)
F24C 3/08     (2006.01)
A47J 36/00    (2006.01)

(52) U.S. Cl.
CPC .............. *F24C 3/085* (2013.01); *A47J 36/00* (2013.01)

(58) Field of Classification Search
CPC ....... A47J 2202/00; A47J 31/58; F24C 7/082; F24C 15/10; F24C 7/083; H05B 3/746
See application file for complete search history.

(56) References Cited

U.S. PATENT DOCUMENTS

| | | | | |
|---|---|---|---|---|
| 2,100,292 A | * | 11/1937 | Schneider | F24C 3/085 126/39 H |
| 2,320,754 A | * | 6/1943 | Sherman | F23D 14/06 126/214 A |
| 2,506,483 A | * | 5/1950 | Bechtold | F24C 3/085 126/214 R |
| 3,941,117 A | * | 3/1976 | Pei | F24C 15/10 126/215 |
| 6,032,662 A | * | 3/2000 | Taplan | F24C 3/085 126/214 R |
| 6,104,007 A | * | 8/2000 | Lerner | F24C 15/105 126/39 H |
| 6,639,190 B2 | * | 10/2003 | Lerner | A47J 31/58 219/445.1 |
| 6,700,100 B2 | * | 3/2004 | Lerner | A47J 31/58 219/445.1 |
| 6,806,444 B2 | * | 10/2004 | Lerner | A47J 31/58 219/445.1 |

(Continued)

FOREIGN PATENT DOCUMENTS

WO    WO2013017986 A2    2/2013

*Primary Examiner* — Jorge A Pereiro
(74) *Attorney, Agent, or Firm* — Dority & Manning, P.A.

(57) ABSTRACT

An appliance and illumination system for a gas burner assembly is provided. The illumination system may include a panel, a light source, and a transmission plate. The panel may be extending in a lateral direction and a transverse direction. The panel may include a top surface and a bottom surface. The panel may also define an opening extending between the top surface and the bottom surface. The light source may be disposed beneath the panel along a vertical axis and oriented to project a light emission towards the opening. The transmission plate may be mounted to the panel. The transmission plate may include an upper face disposed beneath the opening of the panel along the vertical axis, the transmission plate being positioned to direct the light emission through the opening and above the top surface.

15 Claims, 4 Drawing Sheets

(56) References Cited

U.S. PATENT DOCUMENTS

| | | | | |
|---|---|---|---|---|
| 7,087,865 B2* | 8/2006 | Lerner | ................... | G02B 6/001 |
| | | | | 219/445.1 |
| 7,112,766 B2* | 9/2006 | Lerner | ................... | A47J 31/58 |
| | | | | 219/445.1 |
| 7,173,221 B2* | 2/2007 | Lerner | ................... | F23D 14/72 |
| | | | | 219/445.1 |
| 7,967,004 B2* | 6/2011 | Inzaghi | ................ | F23D 14/045 |
| | | | | 126/214 C |
| 8,616,193 B2 | 12/2013 | Padgett | | |
| 8,667,958 B2 | 3/2014 | Cadima | | |
| 9,109,803 B2 | 8/2015 | Motabar et al. | | |
| 2002/0113057 A1* | 8/2002 | Lerner | ................... | A47J 31/58 |
| | | | | 219/445.1 |
| 2003/0006227 A1* | 1/2003 | Lerner | ................... | A47J 31/58 |
| | | | | 219/445.1 |
| 2003/0101980 A1* | 6/2003 | Brown | ................... | F23D 14/06 |
| | | | | 126/39 R |
| 2003/0192873 A1* | 10/2003 | Lerner | ................... | A47J 31/58 |
| | | | | 219/445.1 |
| 2003/0192874 A1* | 10/2003 | Lerner | ................... | A47J 31/58 |
| | | | | 219/445.1 |
| 2004/0026404 A1* | 2/2004 | Lerner | ................... | A47J 31/58 |
| | | | | 219/445.1 |
| 2004/0112887 A1* | 6/2004 | Lerner | ................... | A47J 31/58 |
| | | | | 219/445.1 |
| 2004/0188414 A1* | 9/2004 | Lerner | ................... | A47J 31/58 |
| | | | | 219/445.1 |
| 2004/0238524 A1* | 12/2004 | Lerner | ................... | H05B 3/68 |
| | | | | 219/445.1 |
| 2005/0064354 A1* | 3/2005 | Lerner | ................... | F23D 14/72 |
| | | | | 431/13 |
| 2009/0101132 A1* | 4/2009 | Inzaghi | ................ | F23D 14/045 |
| | | | | 126/39 R |
| 2009/0320823 A1* | 12/2009 | Padgett | ................... | F23D 14/06 |
| | | | | 126/39 E |
| 2010/0005976 A1 | 1/2010 | Inzaghi | | |
| 2010/0089384 A1* | 4/2010 | Inzaghi | ................... | F23D 14/06 |
| | | | | 126/39 E |
| 2015/0040887 A1 | 2/2015 | Angulo | | |

* cited by examiner

ILLUMINATED COOKTOP BURNER APPLIANCE

FIELD OF THE INVENTION

The present disclosure generally relates to cooktop appliances, and more particularly to illumination of a burner in an appliance.

BACKGROUND OF THE INVENTION

Generally, gas cooktop appliances include a plurality of gas burners mounted to a top surface of the appliance. In existing systems, it can be difficult to determine when a burner is active. Although a flame may be visible once ignited, users may find it difficult to know if gas is being supplied during a pre-ignition sequence. Moreover, even after ignition, it can be difficult to quickly determine the status of a burner without closely examining a control knob or the burner itself. In some systems, fiber optic cables or light pipes have been used to carry light to a section of the top cap of a gas burner. Other systems have placed lights radially outward from the burner. However, these arrangements can lead to potential gas leaks, difficulties during assembly, cleaning barriers, and interference with conduits supplying fuel to the burner assembly. Along with reducing overall reliability of the burner, these existing systems can greatly increase the expense and effort required to repair one or more portions of the appliance. Moreover, they may become difficult to see when a utensil is placed on or near the burner.

Accordingly, a cooktop appliance with features for clearly illuminating one or more burners would be useful. It would be advantageous to be able to illuminate a gas burner in a manner that ensures ease of assembly and does not inhibit cleaning. Useful systems may further avoid interference with gas transmission to the burner and eliminate the need for expensive light pipes. In turn, it would be desirable to provide a system and apparatus that addresses at least some of the problems identified above.

BRIEF DESCRIPTION OF THE INVENTION

Aspects and advantages of the invention will be set forth in part in the following description, or may be obvious from the description, or may be learned through practice of the invention.

In one aspect of the present disclosure, an exemplary illumination system for a gas burner assembly is provided. The illumination system may include a panel, a light source, and a transmission plate. The panel may be extending in a lateral direction and a transverse direction. The panel may include a top surface and a bottom surface. The panel may also define an opening extending between the top surface and the bottom surface. The light source may be disposed beneath the panel along a vertical axis and oriented to project a light emission towards the opening. The transmission plate may be mounted to the panel. The transmission plate may include an upper face disposed beneath the opening of the panel along the vertical axis, the transmission plate being positioned to direct the light emission through the opening and above the top surface.

In another aspect of the present disclosure, an exemplary cooktop appliance is provided. The appliance may include a panel, a burner, a light source, and a transmission plate. The panel may include a top surface and a bottom surface. The burner may at least partially above the top surface of the panel along a vertical axis. The light source may be disposed beneath the panel along the vertical axis to project a light emission beneath the burner. The transmission plate may be mounted to the panel. The transmission plate may include an upper face disposed beneath the bottom surface to direct the light emission above the top surface of the panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
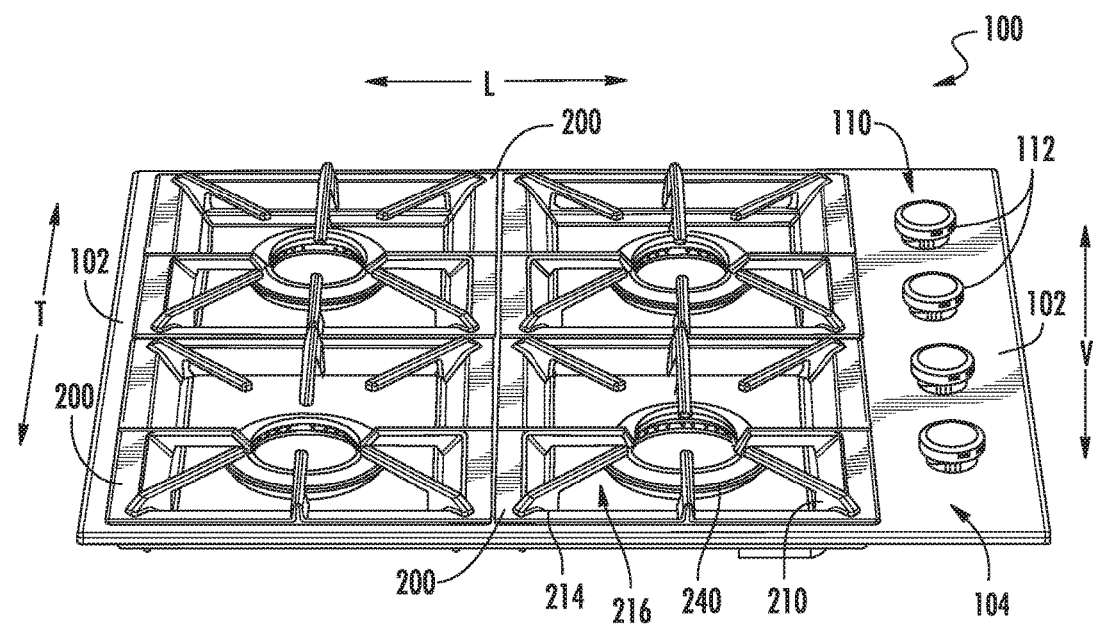
FIG. 1 provides a top, perspective view of a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some exemplary embodiments, the present subject matter provides a cooktop appliance and illumination system. The cooktop appliance includes a gas burner assembly supported on a panel of the cooktop appliance at a top surface of the panel. The illumination system is at least partially disposed beneath the gas burner assembly and includes a transmission plate and light source. Generally, the transmission plate is positioned to receive light from the light source and transmit a portion of that light above the cooktop appliance.

FIG. 1 illustrates an exemplary embodiment of a cooktop appliance 100 as may be employed with the present subject matter. The exemplary cooktop appliance 100 includes a panel 102, e.g., a top panel, that extends in a lateral direction L and a transverse direction T. By way of example, the panel 102 may be constructed of enameled steel, stainless steel, glass, ceramics, and combinations thereof.

For the cooktop appliance 100, a utensil holding food and/or cooking liquids (e.g., oil, water, etc.) may be placed onto one or more gas burner assemblies 200 at a location of any gas burner assembly 200. The gas burner assemblies 200 can be configured in various sizes so as to provide e.g., for the receipt of cooking utensils (i.e., pots, pans, etc.) of various sizes and configurations and to provide different heat inputs for such cooking utensils. Each gas burner assembly 200 includes a burner 240 supported on a top surface 104 of panel 102, as discussed in greater detail below. During use, the gas burner assemblies 200 generally provide thermal energy to cooking utensils above panel 102.

A user interface panel 110 is located within convenient reach of a user of the cooktop appliance 100. For this exemplary embodiment, the user interface panel 110 includes knobs 112 that are each associated with one of the gas burner assemblies 200. The knobs 112 allow the user to activate each burner assembly 200 and determine an amount of heat input provided by each gas burner assembly 200 to a cooking utensil located thereon. The user interface panel 110 may also be provided with one or more graphical display devices that deliver certain information to the user such as e.g., whether a particular burner assembly is activated and/or the level at which the burner assembly is set.

Figure 2:
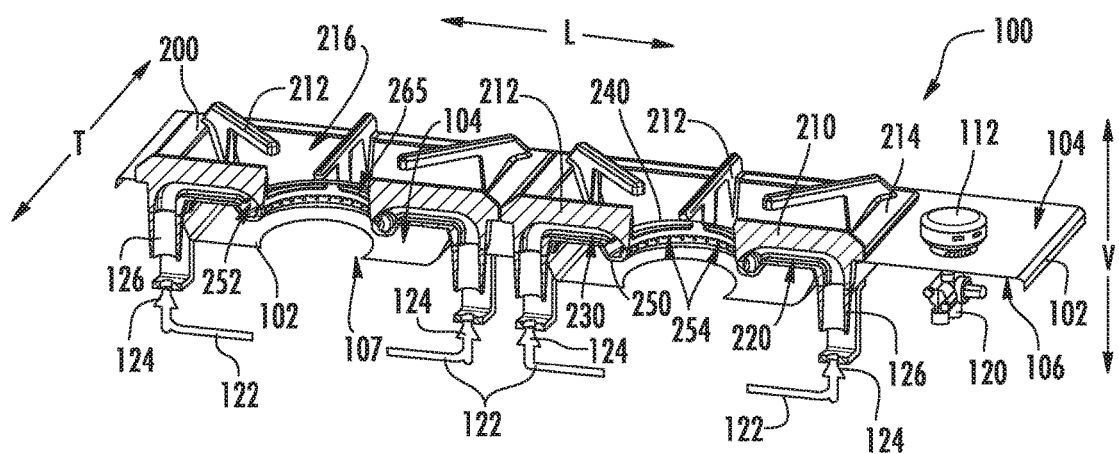
FIG. 2 provides a front, cross-sectional view of the exemplary cooktop appliance of FIG. 1.
Figure 3:
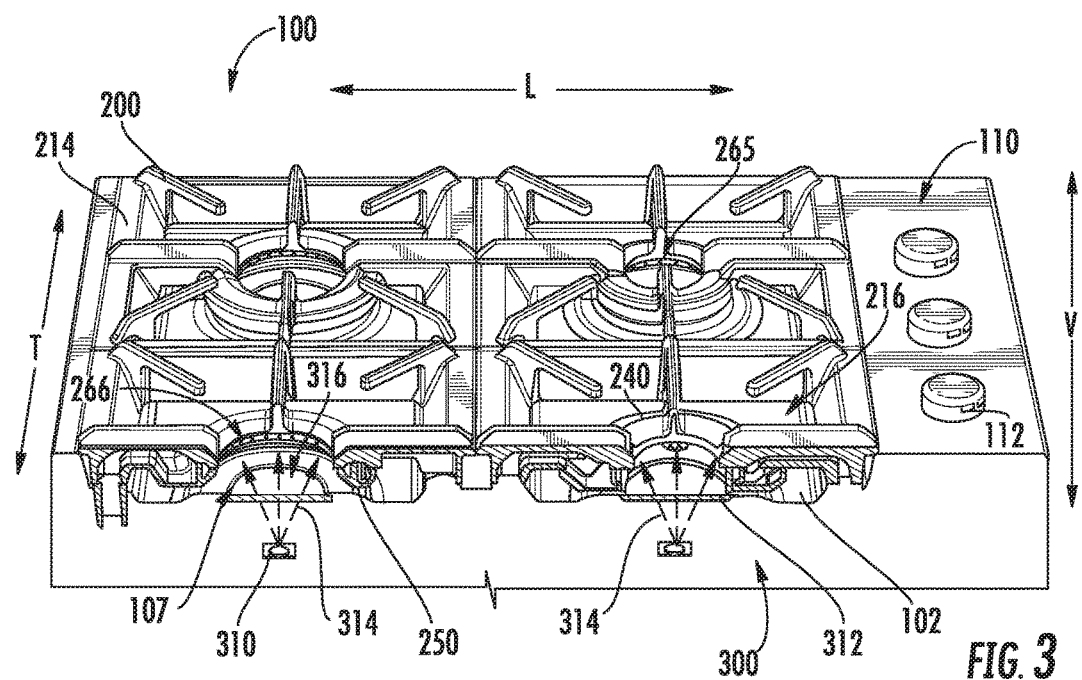
FIG. 3 provides a top, cross-sectional perspective view of a cooktop appliance according to an exemplary embodiment of the present subject matter.
Figure 4:
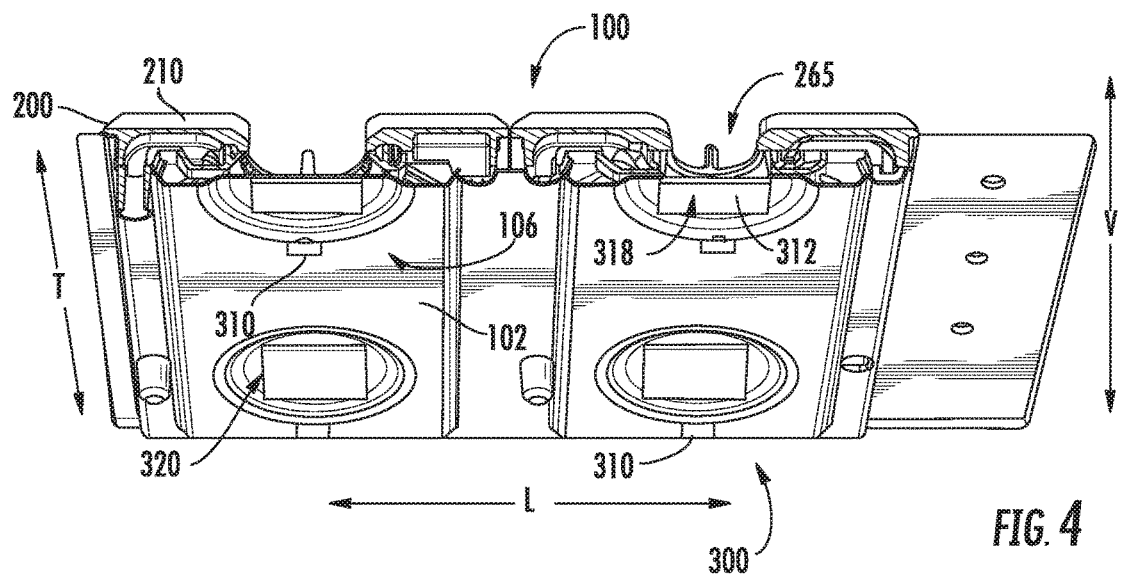
FIG. 4 provides a bottom, cross-sectional perspective view of the exemplary cooktop appliance of FIG. 3.

Referring now to FIGS. 1 through 3, operation of the cooking appliance 100 can be regulated by a controller (not shown) that is operatively coupled i.e., in operative communication with, the user interface panel 110, illumination system 300, and/or gas burner assemblies 200. For example, in response to user manipulation of the knobs 112 of user interface panel 110, the controller operates one of the burners 240. Similarly, in response to user manipulation of the knobs 112 of the user interface panel 110, the controller operates the illumination system 300. By way of example, the controller may include a memory and one or more processing devices such as microprocessors, CPUs or the like, such as general or special purpose microprocessors operable to execute programming instructions or microcontrol code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout appliance 100. In exemplary embodiments, the controller may be located under or next to the user interface panel 110. In such an embodiment, input/output ("I/O") signals are routed between the controller and various operational components of appliance 100, such as the gas burner assemblies 200, controls 112, illumination system 300, a graphical display, one or more sensors, and/or one or more alarms. In one embodiment, the user interface panel 110 may represent a general purpose I/O ("GPIO") device or functional block.

Although shown with multiple knobs 112, it should be understood that knobs 112 and the configuration of the cooktop appliance 100 shown in FIGS. 1 through 3 are provided by way of example only. More specifically, the user interface panel 110 may include various input components, such as one or more of a variety of touch-type controls, electrical, mechanical or electro-mechanical input devices including rotary dials, push buttons, and touch pads. The user interface panel 110 may include other display components, such as a digital or analog display device designed to provide operational feedback to a user. The user interface 110 may be in communication with the controller via one or more signal lines or shared communication busses. The user interface 110 may be located on a different surface of the appliance, for instance, an angled front edge or a vertical backsplash.

The cooktop appliance 100 shown in FIGS. 1 through 3 illustrates an exemplary embodiment of the present subject matter. Thus, although described in the context of cooktop appliance 100, the present subject matter may be used in cooktop appliances having other configurations, e.g., a cooktop appliance with one, two, or more additional burner assemblies. Similarly, the present subject matter may be used in cooktop appliances that include an oven, i.e., range appliances.

FIG. 2 provides a perspective, cross-sectional view of cooktop appliance 100. As seen in FIG. 2, one or more gas burner assemblies 200 are removable from panel 102 of cooktop appliance 100. In certain exemplary embodiments, no mechanical fastening connects gas burner assembly 200 to panel 102. Thus, each gas burner assembly 200 may be unfastened (i.e., not fastened) to panel 102, and a user may simply lift gas burner assembly 200 upwardly (in relation to the vertical axis V) to remove gas burner assembly 200 from panel 102, as shown in FIG. 2. In such a manner, top surface 104 of panel 102 below gas burner assembly 200 may be easily accessible and cleanable.

As shown in FIG. 2, the cooktop appliance 100 includes control valves 120, fuel lines 122, and fuel orifices 124. Control valves 120 may be mounted to panel 102 at a bottom surface 106 of panel 102. Fuel lines 122 and fuel orifices 124 may also be positioned below panel 120, e.g., at or adjacent bottom surface 106 of panel 102. The control valves 120 are each coupled to a respective one of knobs 112. Thus, a user may adjust one or more of the control valves 120 with the knobs 112. The control valves 120 are configured for regulating fuel flow to gas burner assemblies 200. For example, each control valve 120 blocks fuel flow to gas burner assemblies 200 when control valves 120 are closed. Conversely, each control valve 120 permits fuel flow to a gas burner assembly 200 when control valves 120 are open. A user may selectively adjust control valves 120 between the open and closed configurations with the knobs 112 in order to regulate fuel flow to gas burner assemblies 200.

Generally, it is understood that the fuel lines 122 extend between control valves 120 and fuel orifices 124. Thus, the control valves 120 and fuel orifices 124 may be coupled to the fuel lines 122. When the control valves 120 are open, fuel, such as propane or natural gas, may flow through the fuel lines 122 to the fuel orifices 124. From the fuel orifices 124, fuel may flow into gas burner assemblies 200, where the fuel may be subsequently combusted.

Between the fuel orifices 124 and the gas burner assemblies 200, fuel from the fuel orifices 124 may entrain and mix with air. The cooktop appliance 100 includes features for assisting mixing of air and fuel as fuel enters the gas burner assemblies 200. In particular, the cooktop appliance 100 includes mixing tubes 126 that receive fuel and air, facilitating fluid mixing of the fuel and air. For example, the mixing tubes 126 may be Venturi mixers that define tapered channels such that a pressure of the fuel and air decreases while a velocity of the fuel and air increases. Other suitable means for mixing fuel and air are also contemplated and within the scope of the present subject matter. Downstream of the mixing tubes 126, the pressure of the fuel and air may increase while the velocity of the fuel and air decreases to further assist fluid mixing between the fuel and air entering the gas burner assemblies 200.

As shown in FIG. 2, each gas burner assembly 200 includes a grate 210 and a burner 240. The grate 210 is configured for supporting a cooking utensil, such as a pot, pan, etc. For example, the grate 210 of the exemplary embodiment includes a plurality of elongated members 212, e.g., formed of cast metal, such as cast iron. The cooking utensil may be placed on the elongated members 212 of the grate 210 such that the cooking utensil rests on an upper surface of elongated members 212. The elongated members 212 of the grate 210 may include an outer frame 214 that extends around or defines a perimeter of the grate 210 and/or gas burner assembly 200. Thus, the outer frame 214 may be positioned at an outer portion of the grate 210. When assembled, the grate 210 may rest on panel 102 at the outer frame 214. Thus, a bottom surface of outer frame 214 may rest on the top surface 104 of panel 102. As shown, the outer frame 214 of grate 210 may be square or rectangular in certain exemplary embodiments. Within the outer frame 214, elongated members 212 define an inner passage 216 that extends vertically through grate 210 from the mixing chamber 126. Thus, fluid, such as air, may flow through grate 210 via inner passage 216.

In the exemplary embodiment of FIG. 2, the burner 240 includes a burner ring 250 positioned on and fixed to the grate 210. Furthermore, the exemplary burner ring 250 extends circumferentially about the central void 265. Both the burner ring 250 and grate 210 may be selectively removed from the panel 210 (e.g., during cleaning operations). The burner ring 250 has a fuel chamber 252 and a plurality of flame ports 254. As shown, the central void 265 extends uninterrupted from the top panel 102 to the region above the burner ring 250 and grate 210. The grate 210 defines a first internal fuel passage 220 and a second internal fuel passage 230. The first and second internal fuel passages 220, 230 are configured for directing fuel through the grate 210 to the burner 240. According to the illustrated exemplary embodiment, the first internal fuel passage 220 and second internal fuel passage 230 are contiguous with the fuel chamber 252 of the burner ring 250. Thus, fuel from the fuel passages 220, 230 may flow into the fuel chamber 252 of the burner ring 250 and exit the fuel chamber 252 of the burner ring 250 at flame ports 254, where such fuel may be combusted. Although two fuel passages 220, 230 are shown, one skilled in the art will appreciate that only a single fuel passage may be needed according to alternative embodiments.

In addition, although the exemplary embodiment of FIGS. 1 and 2 shows the burner 240 having a single burner ring 250, the present disclosure is not so limited. For example, according to an alternative exemplary embodiment, the burner 240 may be a multi-ring burner. For example, such a multi-ring burner may have an inner burner ring and an outer burner ring concentrically positioned such that outer burner ring extends around the inner burner ring. An inner fuel chamber may be separated from an outer fuel chamber by a wall within burner, and burner may be configured to supply fuel to a plurality of flame ports on the inner burner and outer burner, respectively. Optionally, if a multi-ring burner is used, each passage 220, 230 may be configured to provide fuel to a single ring of the multi-ring burner. Other configurations are also possible.

Turning to FIGS. 2 through 6, the top panel 102 defines an opening 107 extending between the top surface 104 and the bottom surface 106. In exemplary embodiments, the opening 107 is vertically aligned with central void 265 and substantially concentric with the burner ring 250. As a result, the positions of the opening 107 and central void 265 at least partially overlap in both the lateral direction L and transverse direction T such that the central void 265 extends over the opening 107. In some exemplary embodiments, the opening 107 is positioned directly beneath the central void 265 along the vertical axis V. In further embodiments, the opening 107 and central void 265 may share a common axis (i.e., be arranged as coaxial members). As concentric members, the opening 107 may be defined radially inward from a respective burner ring 250. An illumination system 300 is provided with the gas burner assembly 200 in exemplary embodiments. As will be described below, the illumination system 300 is generally mounted to the appliance 100 and serves as a visual indicator for certain functions thereof, as described in detail below.

As shown, the illumination system 300 provides a light source 310 and transmission plate 312 disposed beneath the gas burner assembly 200. Specifically, light source 310 is disposed beneath the panel 102 along the vertical axis V. The light source 310 is oriented to project light emission(s) 314 towards and through the opening 107 in the top panel 102. The transmission plate 312 may be mounted to the panel 102 to receive one or more of the light emission(s) 314. Once received, the transmission plate 312 may direct at least a portion of the emission(s) 314 through the opening 107 and above the top surface 104. In turn, activation of the light source 310, initiated by one or more user inputs (e.g., at the user interface panel 110), can selectively illuminate an area above the top surface 104.

Upon the light source 310 being activated, light emission(s) 314 may travel directly to the light transmission plate 312 before being directed to the area above the top surface 104. Specifically, light emission(s) 314 may be projected vertically through central void 265 and grate 210 before being visible above gas burner assembly 200. If a utensil is placed on the grate 210, light emission(s) 314 may be directed about the utensil's bottom surface 106 and to the edges of the grate 210 through the inner passage 216.

In optional embodiments, the light source 310 is vertically aligned with the transmission plate 312. As a result, the positions of the light source 310 and the transmission plate 312 at least partially overlap in both the lateral direction L and transverse direction T such that the transmission plate 312 extends over the light source 310. In some exemplary embodiments, the light source 310 is positioned directly beneath the transmission plate 312 along the vertical axis V. In further embodiments, the light source 310 and transmission plate 312 may share a common axis (i.e., be arranged as coaxial members). The space between the light source 310 and the transmission plate 312 may be unimpeded, advantageously simplifying assembly and preventing undesired light diffusion. Moreover, the light source 310 may be disposed at a suitable distance to avoid excessive or damaging heat from the gas burner assembly 200.

The light source 310 may generally include a suitable light generator, such as a fluorescent or incandescent bulb. In specific embodiments, the light source 310 includes light emitting diode (LED). The LED can be configured as any suitable color. Optionally, the LED can be configured to vary the color or illumination intensity (i.e., luminance) of the light emission(s) 314. For instance, the light source 310 may be configured to provide a predetermined light emission color or intensity based on a signal from one or more input (e.g., from the user interface panel 110 and/or controller). Moreover, the color or intensity may be correlated to a specific setting or settings, such as the positioning of knobs 112 and/or the heat output by the burner 240.

In one embodiment, the light source 310 is substantially controlled by a separate switch (not shown) in communication with the user interface panel 110. The light source 310 is configured to activate or energize simultaneously with the gas burner assembly 200, such as by turning the knobs 112. Light intensity can be correlated to a heat or flame setting. Optionally, the light intensity can also be varied by the position of a knob 112. For example, when the knob 112 is in a low heat output position, the intensity of the light source 310 can be set at a low emission setting (i.e., wherein luminance is relatively low in relation to the maximum potential luminance level of the light source 310). When the knob 112 is placed in a high heat output position, the intensity of the light source 310 can be at a high emission setting (i.e., wherein luminance is relatively high in relation to the maximum potential luminance level of the light source 310). Between the low and high setting positions of the knob 112, the intensity level of the light source 310 can be varied accordingly.

In an additional or alternative embodiment, the color of the light source 310 and light emission(s) 314 can be correlated to a heat or flame setting, e.g., such that color is varied according the position of the knob 112. At a low heat setting or position of knob 112, the light source 310 has one color or intensity. At a next or higher heat setting of the knob 112, the light source 310 is another color or intensity. The number of color or intensity changes is dependent upon the number of colors or potential intensity associated with, e.g., the LED.

In further additional or alternative embodiments, the light source 310 can also be used to indicate that a temperature of the cooktop and/or burner assembly 200 is hot, or at a temperature where user contact should be avoided. For instance, a temperature sensor or switch (not shown) can be disposed in communication with the light source 310 to control the on and off state, color, and intensity of the light source 310.

As illustrated in FIGS. 3 through 6, the transmission plate 312 may be selectively mounted to the top panel 102 above the light source 310. Generally, the transmission plate 312 comprises one or more substantially transparent or translucent materials. Moreover, the material that forms the transmission plate 312 may be a suitable glass, ceramic, or polymeric material. For instance, in one embodiment, the transmission plate 312 is formed from a glass-ceramic material. Upon receiving light emission(s) 314 from the light source 310, at least a portion of the light emission(s) 314 may be directed through the transmission plate 312, while the remainder is reflected or absorbed by the plate 312 before reaching the opening 107.

As shown, an upper face 316 of the transmission plate 312 can be placed on or against the panel 102 while a lower face 318 is directed toward the light source 310 to receive emission(s) 314. The light transmission plate 312 may be defined along an outer perimeter 320 that is sized to have an area greater than that of the opening 107. In some exemplary embodiments, the upper face 316 spans across the opening 107 of the panel 102 in both the lateral direction L and the transverse direction T. In turn, the transmission plate 312 may completely cover the cross sectional area of the opening 107, preventing the passage of most solids or liquids through the opening 107 to the area below the bottom surface 106 of the top panel 102. Optionally, the outer perimeter 320 may be attached to the bottom surface 106. In certain exemplary embodiments, the perimeter 320 defines multiple corners 322, such as in a square or rectangle. When assembled, each corner 322 may engage the bottom surface 106.

Figure 5:
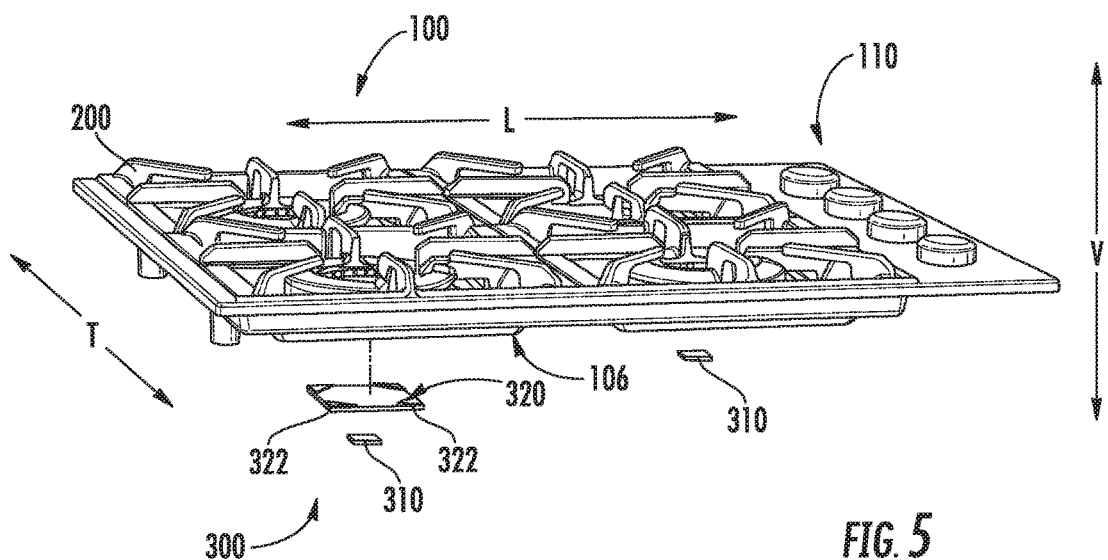
FIG. 5 provides a front, partially-exploded cross-sectional perspective view of a cooktop appliance according to an exemplary embodiment of the present subject matter.

In optional exemplary embodiments, the transmission plate 312 may be selectively mounted to the top panel 102, thus, allowing removal and reattachment of the transmission plate 312 to the top panel 102. Advantageously, a selectively removable configuration may allow users to readily access the light source 310 and clean/replace the light transmission plate 312. One or more suitable connectors may be provided to secure the transmission plate 312 to the appliance 100. In the embodiment of FIG. 5, an adhesive film is applied directly to each corner 322 of the upper surface. When placed on the bottom surface 106, the adhesive film may attach the transmission plate 312 to the portion of the bottom surface 106 surrounding the opening 107.

Figure 6:
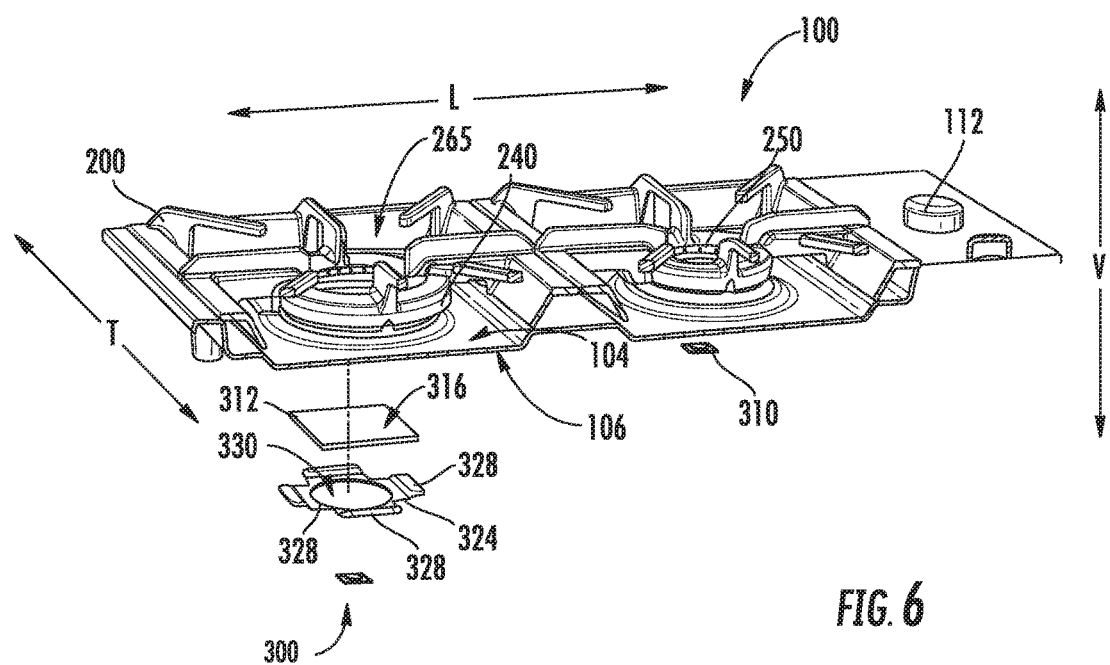
FIG. 6 provides a front, partially-exploded cross-sectional perspective view of a cooktop appliance according to an exemplary embodiment of the present subject matter.

In additional or alternative embodiments, such as that provided in FIG. 6, a plate support bracket 324 selectively holds the light transmission plate 312 to the panel 102. In exemplary embodiments, the plate support bracket 324 is attached to the bottom surface 106 and includes a pocket 326 to support the lower face 318 of the transmission plate 312. In certain exemplary embodiments, the pocket 326 defines a recess in which the transmission plate 312 can rest. The pocket 326 may be generally open above the recess to receive the transmission plate 312 and permit the passage of light at the upper face 316. A hole 330 defined through the pocket 326 allows light emission(s) 314 to pass to the light transmission plate 312. One or more tabs 328 bound the pocket 326, and in turn, the transmission plate 312. When attached on the top panel 102, the tab(s) 328 engage the bottom surface 106, e.g., through an adhesive, mated hook, or other suitable mechanical attachment.

Figure 7:
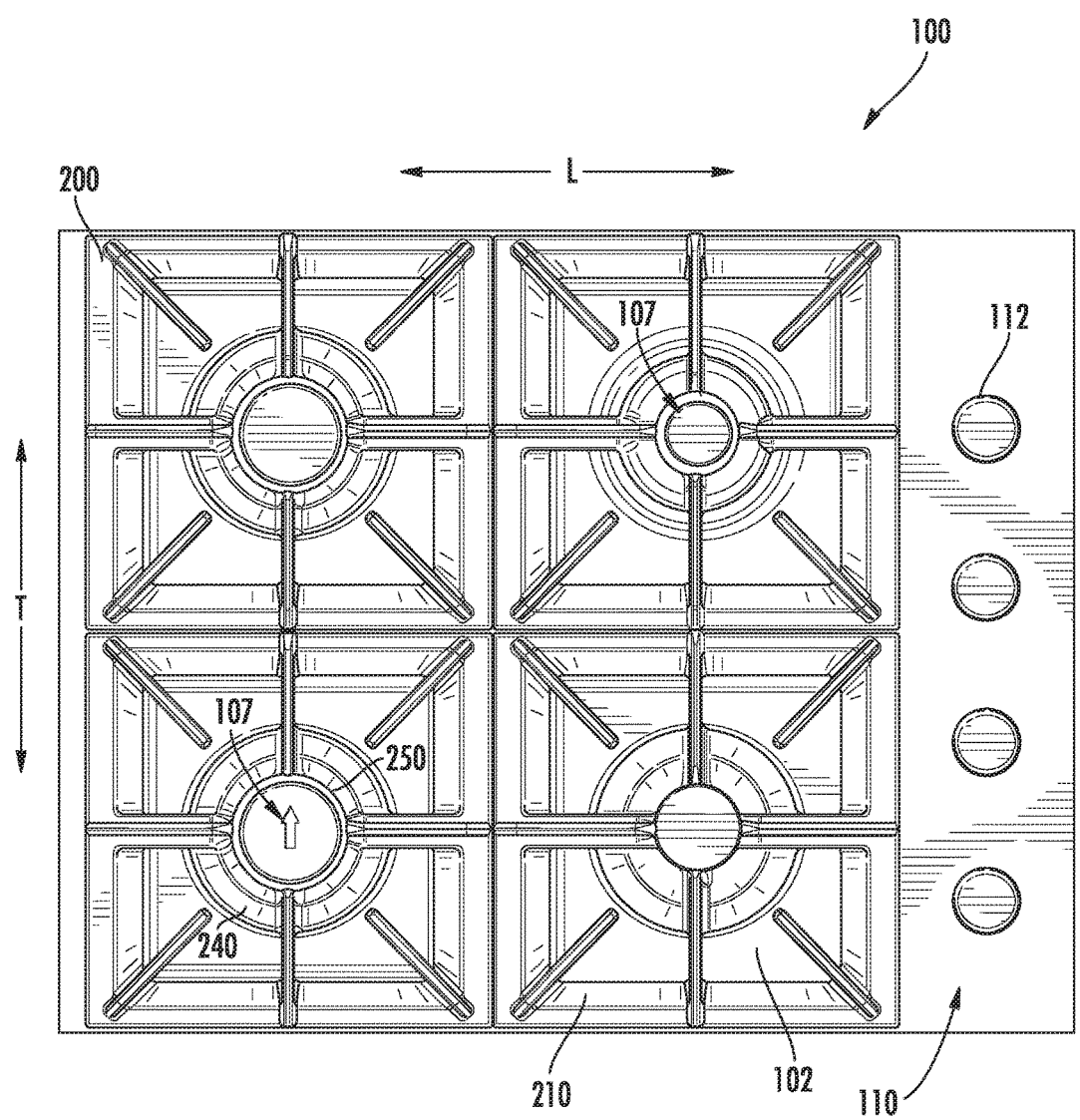
FIG. 7 provides a top view of an exemplary cooktop appliance according to an exemplary embodiment of the present subject matter.

As noted above, the opening 107 defined by the panel 102 can be formed to have an area or profile that is smaller than that of the burner 240 and/or burner ring 250. For instance, the exemplary embodiments illustrated in FIGS. 1 through 7 include multiple openings 107 defined within (i.e., radially inward from) respective burner rings 240. Some exemplary embodiments of the opening 107 have a circular profile concentric to a respective burner ring 250. Alternative embodiments, such as that illustrated in FIG. 7, include one or more openings 107 that have a non-circular profile. For instance, one or more opening 107 may be defined to have a profile an arrow, square, or other suitable shape that is visible above the burner 240 and grate 210. Optionally, multiple discrete openings may be defined within a single burner ring 250.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
  a panel including a top surface and a bottom surface;
  a burner extending at least partially above the top surface of the panel along a vertical axis;

a light source disposed beneath the panel along the vertical axis to project a light emission beneath the burner; and a transmission plate mounted to the panel, including an upper face disposed beneath the bottom surface to direct the light emission above the top surface of the panel, wherein the burner includes a gas burner ring extending circumferentially about a central void extending from the panel to an area above the burner, wherein the transmission plate is vertically aligned with the central void and spans across the central void below the burner and along the bottom surface of the panel in a lateral direction and a transverse direction, and wherein the light source is directed at the transmission plate beneath the panel to direct the light emission through the transmission plate, the central void, and the gas burner ring.

2. The cooktop appliance of claim 1, wherein the light source includes a light emitting diode.

3. The cooktop appliance of claim 1, wherein the light source is vertically aligned with the burner.

4. The cooktop appliance of claim 3, further comprising a removable grate fixed to the burner and disposed thereabove, wherein the grate includes a plurality of elongated members to permit passage of the light emission from the transmission plate.

5. The cooktop appliance of claim 4, wherein the grate defines an internal fuel passage.

6. The cooktop appliance of claim 1, wherein the transmission plate includes a glass ceramic plate.

7. The cooktop appliance of claim 1, wherein the transmission plate includes an outer perimeter attached to the bottom surface of the panel.

8. The cooktop appliance of claim 1, further comprising a plate support bracket disposed below the burner, wherein the transmission plate is selectively received within the plate support bracket.

9. A cooktop appliance comprising:
a panel extending in a lateral direction and a transverse direction, the panel including a top surface and a bottom surface, the panel defining an opening extending between the top surface and the bottom surface;
a burner extending at least partially above the top surface of the panel along a vertical axis;
a light source disposed beneath the panel along the vertical axis and oriented to project a light emission towards the opening; and
a transmission plate mounted to the panel, including an upper face disposed beneath the opening of the panel along the vertical axis, the transmission plate being positioned to direct the light emission through the opening and above the top surface,
wherein the burner includes a gas burner ring extending circumferentially about a central void extending from the panel to an area above the burner,
wherein the transmission plate is vertically aligned with the central void and spans across the opening below the burner and along the bottom surface of the panel in a lateral direction and a transverse direction, and
wherein the light source is positioned beneath the panel in vertical alignment with the transmission plate, the opening, and the central void.

10. The cooktop appliance of claim 9, wherein the light source includes a light emitting diode.

11. The cooktop appliance of claim 9, wherein the transmission plate includes a glass ceramic plate.

12. The cooktop appliance of claim 9, wherein at least a portion of the transmission plate is translucent.

13. The cooktop appliance of claim 9, wherein the transmission plate is selectively mounted to the bottom surface.

14. The cooktop appliance of claim 9, wherein the transmission plate includes an outer perimeter attached to the bottom surface of the panel.

15. The cooktop appliance of claim 9, further comprising a plate support bracket attached to the bottom surface of the panel to selectively receive the transmission plate.

* * * * *